United States Patent [19]
Tabata et al.

[11] Patent Number: 5,803,619
[45] Date of Patent: Sep. 8, 1998

[54] ANTIFRICTION BEARING PRE-LOADING DEVICE AND SHAFT BEARING STRUCTURE

[75] Inventors: Shinsuke Tabata; Kiyoshi Ogino, both of Kashihara; Kouichi Ueda, Shiki-gun, all of Japan

[73] Assignees: Koyo Seiko Co., Ltd.; Koyo Machine Industries Co., Ltd., both of Osaka, Japan

[21] Appl. No.: 571,184

[22] Filed: Dec. 12, 1995

[30] Foreign Application Priority Data

Dec. 13, 1995 [JP] Japan ................................. 6-308757

[51] Int. Cl.⁶ ........................... F16C 33/66; F16C 43/04; F16C 23/10
[52] U.S. Cl. ........................... 384/518; 384/562; 384/563
[58] Field of Search ................................. 384/517, 518, 384/563, 493, 557, 562

[56] References Cited

U.S. PATENT DOCUMENTS

| 4,668,109 | 5/1987 | Basso ........................... 384/518 |
| 4,699,528 | 10/1987 | Gotman ........................... 384/518 |
| 4,719,352 | 1/1988 | Miyatake et al. ........................... 384/518 |
| 4,943,170 | 7/1990 | Aida ........................... 384/518 |
| 4,983,050 | 1/1991 | Aida ........................... 384/518 |
| 4,997,290 | 3/1991 | Aida ........................... 384/518 |
| 5,388,917 | 2/1995 | Hibi et al. ........................... 384/517 |

FOREIGN PATENT DOCUMENTS

| 2-83104 | 3/1990 | Japan . |
| 5-177406 | 7/1993 | Japan . |

*Primary Examiner*—Charles A. Marmor
*Assistant Examiner*—Matthew A. Kaness
*Attorney, Agent, or Firm*—Birch, Stewart, Kolasch & Birch, LLP

[57] ABSTRACT

A piston is displaced in a cylinder to pre-load an antifriction bearing. This displacement of the piston is effected according to the amount of working oil confined in a working oil chamber. This oil pressure generating device is equipped with a working oil reservoir to pressurize the working oil in the reservoir for reserving the working oil to be fed to the chamber. An orifice is disposed in a working oil passage for providing the communication between the reservoir and the chamber. The clearance, which is established in the portion of antifriction bearing by the extension or contraction of a shaft due to a temperature change, is absorbed by such displacement of the piston, as is effected by the flow of the working oil between the reservoir and the chamber via the orifice. This orifice acts as a high resistance to and a high rigidity against the abrupt fluctuation in the direction opposite to the pre-loading direction.

30 Claims, 6 Drawing Sheets

ANTIFRICTION BEARING PRE-LOADING DEVICE AND SHAFT BEARING STRUCTURE

BACKGROUND OF THE INVENTION

1. Field of the Invention

The present invention relates to an antifriction bearing pre-loading device for applying an axial pre-load to an antifriction bearing such as an angular contact ball bearing or a tapered roller bearing, and to a shaft bearing structure for bearing a shaft by the antifriction bearing which is pre-loaded by the pre-loading device.

2. Description of Related Art

Generally speaking the pre-load for the antifriction supporting is a load to be applied to rolling elements such as balls or rollers before a bearing load is applied, so as to increase the rigidity of the bearing or eliminate the clearance. Moreover, this pre-load is axially applied to the antifriction bearing which is of the type capable of bearing the axial load. The mode, as known in the prior art, for applying an axial pre-load to the antifriction bearing is exemplified by the predetermined position or pressure pre-load or the variable pre-load.

First of all, the predetermined position pre-load applies an axial pre-load to the antifriction bearing which is being held in a predetermined position by fastening a nut or bolt, and can establish a high rigidity because of a small axial displacement of the antifriction bearing so that it is suitable for the spindle of a machine tool, for example. The next predetermined pressure pre-load applies a predetermined axial pre-load to the antifriction bearing by using a coil spring or belleville spring and can absorb the fluctuation of the load or the extension or contraction of the shaft due to the temperature difference between the shaft being run and the housing, so that its amount can be little fluctuated to apply a stable pre-load. Hence, the predetermined pressure pre-load is suitable for such a small-sized electric motor or a household electric machine as is required to have low vibration or noise. Incidentally, the last variable pre-load can be controlled by using a hydraulic or piezoelectric element so that it can apply a suitable pre-load according to the running situation.

However, the predetermined position pre-load can establish a high rigidity but cannot response to the extension or contraction, if any, of the housing or shaft due to the temperature change, and its amount may become short depending upon the running situation. On the other hand, the predetermined pressure pre-load can absorb the aforementioned extension or contraction against the temperature change so that it is excellent in the responsiveness. In case, however, the load applied in the direction opposite to the axial pre-loading direction undergoes especially high fluctuations, the pre-loading spring may be deformed backward to lose its pre-loading function seriously. Hence, this predetermined pressure pre-load is inferior in the rigidity to the foregoing pre-load of the predetermined position type.

Incidentally, the variable pre-load is free from the individual defects of the predetermined position and pressure preludes but is additionally required to have the control means for changing it. Hence, the device for the variable pre-load is large-sized to a high cost.

SUMMARY OF THE INVENTION

It is, therefore, a main object of the present invention to provide an antifriction bearing pre-loading device which exhibits the function of the predetermined pressure pre-load mode by applying a pre-load steadily to absorb the extension or contraction due to the temperature change in the housing or the shaft thereby to apply a stable axial pre-load to the antifriction bearing, while exhibiting a high rigidity against an abrupt load in the direction opposite to the pre-loading direction thereby to eliminate the defects of the predetermined pressure pre-load.

Another object of the present invention is to provide an antifriction bearing pre-loading device which can ensure and smooth the application of the pre-load to the antifriction bearing.

Other objects of the invention will become apparent more fully from the description given below, but it should be understood that the description and examples give below are intended to illustrate the invention, and not to limit the scope of the invention, since many modifications and variations of the examples disclosed herein are within the scope of the invention.

In order to achieve the above-specified objects, the antifriction bearing pre-loading device according to a preferred embodiment of the present invention which comprises: a cylinder; a pre-loading piston arranged axially displaceably in the cylinder for pre-loading an antifriction bearing; a working oil chamber having its internal capacity made variable according to the volume of working oil to be received, for displacing the piston axially in the cylinder in accordance with the change in the internal capacity; oil pressure generating means including a working oil reservoir for reserving the working oil to be fed to the working oil chamber and for pressurizing and feeding the working oil reserved in the working oil reservoir to the working oil chamber; and a working oil passage including a small-diameter passage for providing the communication between the working oil reservoir and the working oil chamber.

In the antifriction bearing pre-loading device thus constructed according to the present invention, the working oil of the reservoir is pressurized and fed to the working oil chamber by the oil pressure generating means. As a result, the piston applies a predetermined amount of pre-load to the antifriction bearing.

If a clearance is established in the antifriction bearing mounting portion by the extension or contraction of the shaft or the shaft supporting housing due to a temperature change, a small amount of working oil is fed to the working oil chamber from the working oil reservoir via a small-diameter passage. As a result, the piston is displaced toward the pre-loading side to thrust and displace the antifriction bearing thereby to absorb the clearance.

If, on the other hand, the antifriction bearing is thrust in the direction opposite to the pre-loading direction by the extension or contraction of the shaft or housing due to the temperature change, the working oil in the reservoir is discharged to the working oil reservoir via the small-diameter passage by the pressure exerted upon the piston. As a result, the piston itself is displaced in the direction opposite to the pre-loading direction so that a predetermined amount of pre-load is always applied with no clearance being established in the antifriction bearing mounting portion.

Since this thermal extension or contraction is gentle, the working oil can flow via the orifice with little resistance so that the piston can be smoothly displaced.

If, on the contrary, an axial load, i.e., a load opposed to the pre-loading direction is abruptly applied to the antifriction bearing, the working oil in the chamber will be abruptly discharged to the working oil reservoir via the small-diameter passage by the load applied to the piston. At this time, however, the small-diameter passage exerts a high resistance to the abrupt flow of the working oil so that the backward displacement of the antifriction bearing is blocked. In short, a high rigidity is exhibited against the abrupt load in the direction opposite to the pre-loading direction.

In the present invention, preferably, the working oil chamber is defined by the wall of the cylinder forming its space at the back of the piston.

In the present invention, more preferably, a unit casing is fitted in the inner circumference of a housing, in which a shaft is inserted. The wall forming the unit casing forms the cylinder at its axially one side, and the oil pressure generating means is disposed in a plurality of circumferential positions of the axially other side of the unit casing.

In the present invention, more preferably, the small-diameter passage is an orifice or a sintered compact having micro through holes.

In the present invention, more preferably, the working oil passage further includes: a large-diameter passage for providing the communication between the working oil reservoir and the working oil chamber; a block mechanism for closing the large-diameter passage to block the flow of the working oil if the working oil flows in the direction from the working oil chamber to the working oil reservoir; and a bias mechanism for urging the block mechanism in the direction.

In the present invention, more preferably, the oil pressure generating means further includes: a hydraulic cylinder; a floating piston arranged in the hydraulic cylinder for pressurizing the working oil reserved in the working oil reservoir; and an adjusting mechanism for adjusting the degree of pressurization by the floating piston.

In the present invention, more preferably, the adjusting mechanism has an adjusting spring for urging the floating piston in a direction to pressurize and feed the working oil from the working oil reservoir to the working oil chamber.

In the present invention, more preferably, an auxiliary mechanism is disposed in the working oil chamber for urging the pre-loading piston auxiliary in the axial direction.

In the present invention, more preferably, the antifriction bearing is an angular contact ball bearing or a tapered roller bearing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and form a part of this specification, illustrate embodiments of the invention and, together with the description serve to explain the principles of the invention. In the drawings.

DETAILED DESCRIPTION OF THE INVENTION

Here will be described in detail a pre-loading device for an antifriction bearing such as an angular contact ball bearing or a tapered roller bearing of the present invention with reference to the accompanying drawings.

Figure 1:
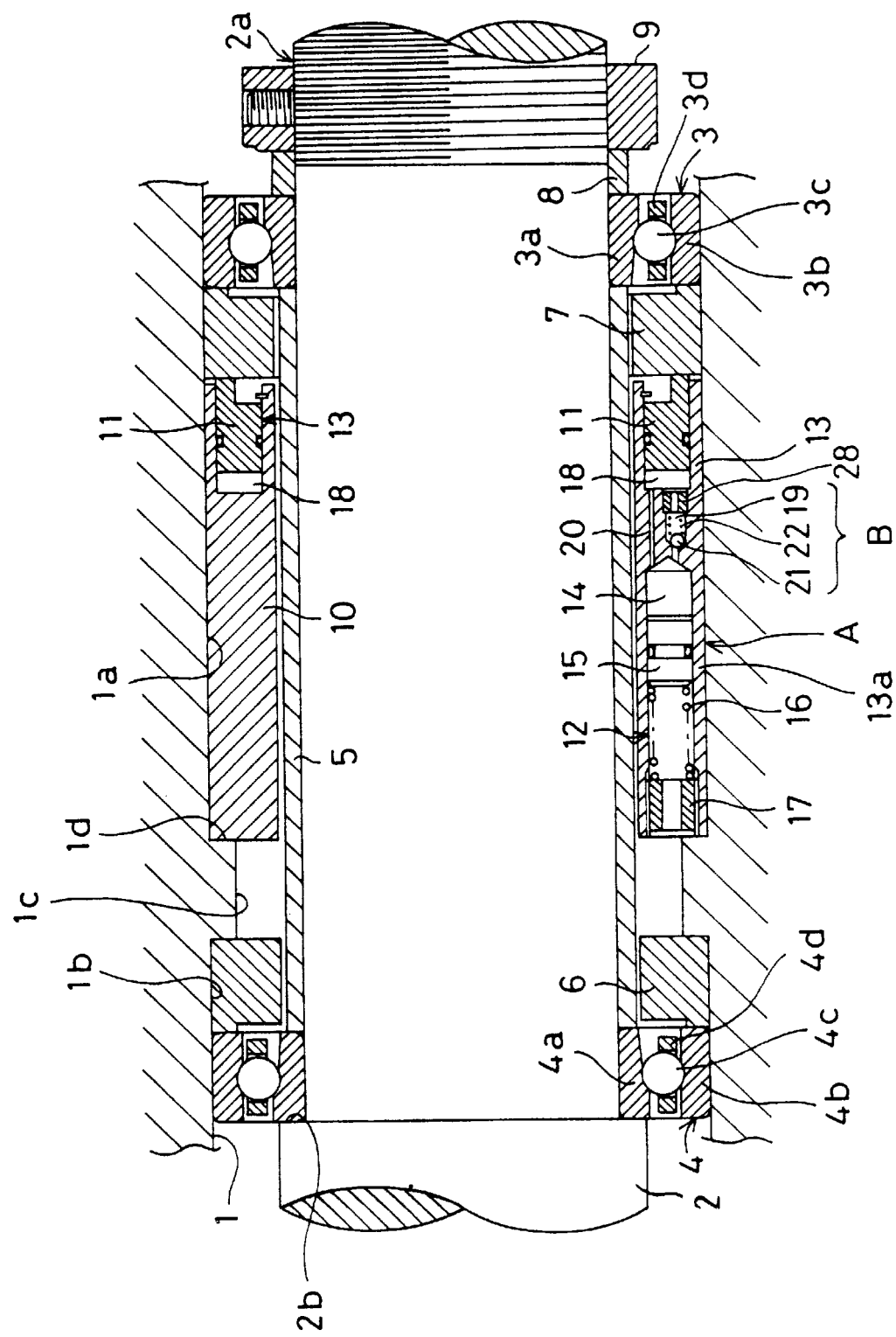
FIG. 1 is a longitudinal section of a bearing structure, in which a shaft is borne in a housing through an antifriction bearing pre-loaded by a pre-loading device according to a first preferred embodiment of the present invention.
Figure 2:
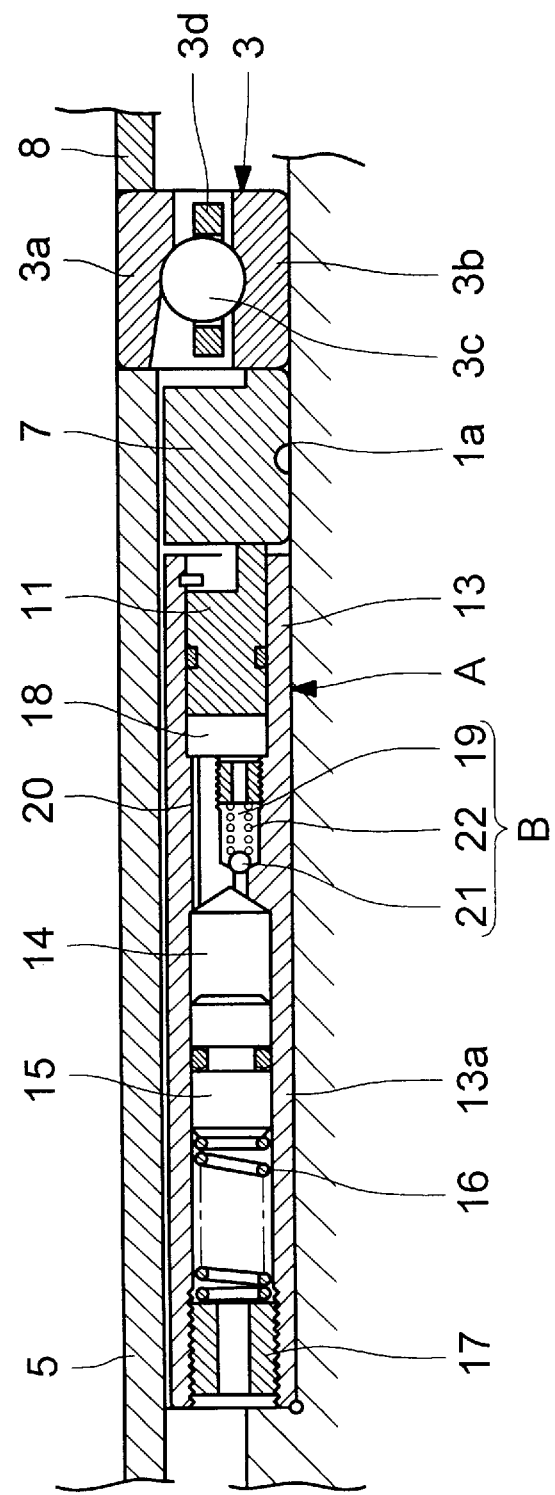
FIG. 2 is an enlarged section of the pre-loading device for the antifriction bearing of FIG. 1.

With first reference to FIGS. 1 and 2, here will be described a pre-loading device for an antifriction bearing according to a first preferred embodiment of the present invention. A pair of antifriction bearings 3 and 4 such as angular contact ball bearings are respectively composed of inner races 3a and 4a, outer races 3b and 4b, balls 3c and 4c, and retainers 3d and 4d. These antifriction bearings 3 and 4 are individually mounted at both sides on the outer circumferences of a shaft 2 extending through a housing 1. The shaft 2 is so stepped at 2b at one end as to have a larger diameter and is rotatably borne in the housing 1 through the antifriction bearings 3 and 4. The housing 1 has bores 1a and 1b defined by a step 1c.

An annular sleeve 5 is fitted on the outer circumference of the shaft 2 and is clamped between the individual inner races 3a and 4a of the two antifriction bearings 3 and 4. An annular positioning collar 6 is so disposed in the bore 1b of the housing 1 and on the outer circumference at one end of the annular sleeve 5 that it abuts against the inner side end of the outer race 4b of the antifriction bearing 4 to position the antifriction bearing 4. An annular positioning collar 7 is so disposed in the bore 1a of the housing 1 and on the outer circumference at the other end of the annular sleeve 5 that it abuts against the inner side end of the outer race 3b of the antifriction bearing 3 to position the antifriction bearing 3.

Another annular positioning collar 8 is arranged at the outer end side of the inner race 3a of the antifriction bearing 3. The antifriction bearing 3 is positioned by those collars 7 and 8. In this case, the collar 7 is in abutment against the outer race 3b of the antifriction bearing 3 whereas the collar 8 is in abutment against the outer end of the inner face 3a of the antifriction bearing 3. The collar 8 is thrust axially in one direction by a nut 9 which is fastened on the threaded portion 2a of the shaft 2. Depending upon the fastening stroke of the nut 9 on the threaded portion 2a, the collar 8 thrusts and fastens the antifriction bearing 3 axially toward one end side.

The antifriction bearing pre-loading device A according to the first preferred embodiment of the present invention is equipped with a cylindrical unit casing 10 which is so clamped between the side wall 1d of the bore 1a of the housing 1 and the collar 7 that it is retained in the axial direction. This unit casing 10 is directed coaxially with the shaft 2. In the unit casing 10, there are disposed an annular pre-loading piston 11 and oil pressure generating means 12. The wall of the unit casing 10 from the center to the axially other end forms an annular pre-loading cylinder 13 for fitting the piston 11 therein.

The cylinder 13 is made annular so that it can pre-load the antifriction bearing uniformly in the circumferential direction. The oil pressure generating means 12 is disposed partially in several portions in the circumferential direction within a range from the center to one axial end of the unit casing 10, as shown. A portion of the wall of the unit casing 10 forms a hydraulic cylinder portion 13a. The cylinder 13 is equipped with portion 13a having a working oil reservoir 14, a floating piston 15 and a spring receiving member 17 so that it can apply an arbitrary pre-load to the antifriction bearing.

The piston 11 is made annular like the cylinder 13 so that it can pre-load the antifriction bearing uniformly in the circumferential direction. The piston 11 is so fitted in the annular cylinder 13, which is formed in the unit casing 10, that its axial outer circumferential end face abuts against the axially inner end of the collar 7 in its entire circumference. In other words, the piston 11 functions to thrust the antifriction bearing 3 axially outward indirectly through the collar 7.

In the oil pressure generating means 12, the working oil reservoir 14 reserves the working oil in circumferentially several portions of the unit casing 10, and the floating piston 15 is arranged axially movably in the hydraulic cylinder portion 13a, which is made of the wall of the unit casing 10, to pressurize the working oil in the working oil reservoir 14. A pressure regulating spring 16 urges the floating piston 15 toward the working oil reservoir 14 to pressurize the working oil in the reservoir 14. The spring receiving member 17 supports the rear end of the pressure regulating spring 16 and can be axially fastened to have its position adjusted. These pressure regulating spring 16 and spring receiving member 17 constitute a regulating mechanism for regulating the thrust of the floating piston 15.

The oil pressure generating means 12 thus constructed is enabled, by adjusting the axially fastening stroke of the spring receiving member 17, to adjust the pressure in the working oil reservoir 14 thereby to establish an arbitrary pre-load easily.

The space in the cylinder 13 at the back of the piston 11 is utilized as a working oil chamber 18 to fill the working oil fed from the reservoir 14, so that the piston 11 is axially displaced according to the amount of the working oil in that space. The working oil chamber 18 is connected to communicate with the individual working oil reservoirs 14 of the oil pressure generating means 12 by way of working oil passages. These working oil passages are constructed of a one-way valve mechanism B and an orifice 20 providing a fine passage having a small diameter.

The one-way valve mechanism B is provided for establishing the communication between the working oil chamber 18 and the individual working oil reservoirs 14. The valve mechanism B is equipped with: a large passage 19 made diametrically larger than the orifice 20; a valve member or ball 21 fitted in the large passage 19 for acting as a check mechanism to allow relatively much working oil to flow from the working oil reservoirs 14 to the working oil chamber 18 but not backwards; and a coil spring 22 for biasing that valve member 21. The coil spring 22 is locked by a pedestal 28 screwed into the charge passage 19. The pedestal 28 has a penetrated oil passageway.

Here will be described the operations of the pre-loading device A according to the first preferred embodiment of the present invention. The working oil in the working oil reservoirs 14 is pressurized and fed with little resistance by the oil pressure generating means 12 to the working oil chamber 18 through the one-way valve mechanism B. As a result, the piston 11 applies a predetermined pre-load to the antifriction bearing 3 through the positioning collar 7. In accordance with this pre-load applied to the antifriction bearing 3, the antifriction bearing 4 is also pre-loaded through the shaft 2.

(a) Here will be described the case in which the housing 1 or the shaft 2 is axially extended or contracted according to a temperature change so that a clearance is established in the portions setting the antifriction bearings 3 and 4. With this clearance, a small quantity of working oil is fed from the working oil reservoirs 14 to the working oil chamber 18 via the large passage 19 and the orifice 20 in the working oil passage. As a result, the oil pressure in the working oil chamber 18 rises to force the piston 11 in the direction to pre-load the antifriction bearing 3. Thus, this antifriction bearing 3 is pushed and displaced to absorb the aforementioned clearance.

(b) If, on the contrary, the housing 1 or the shaft 2 is extended or contracted according to a temperature change so that the antifriction bearing 3 is pushed in the direction opposite to the pre-loading direction, a pressure in this opposite direction is applied to the piston 11 from the antifriction bearing 3 so that it is displaced toward the working oil reservoirs 14, i.e., in the direction to reduce the internal capacity of the working oil chamber 18. As a result, the capacity of the working oil chamber 18 is reduced to discharge the working oil in the chamber 18 to the working oil reservoirs 14 via the orifice 20. In this case, the valve member 21 of the one-way valve mechanism B is urged in the direction to close the large passage 19 by the coil spring 22 so that the large passage 19 is closed by the valve member 21. As a result, the working oil in the chamber 18 is discharged to the working oil reservoirs 14 only via the orifice 20 so that the discharge takes a little-by-little gradual rate. Thus, the piston 11 itself is also displaced backward in the direction opposite to the pre-loading direction so that a predetermined pre-load is always applied to the antifriction bearing 3 with no clearance. Since this extension or contraction of the housing 1 or the shaft 2 slowly occurs due to the temperature change, the working oil can flow with little resistance in the orifice 20 to displace the piston 11 smoothly.

(c) Here will be described the case in which a load (i.e., an axial load) in the direction opposite to the pre-loading direction is abruptly applied to the shaft 2, as different from the aforementioned case of the temperature change. This abrupt load acts upon the piston 11 through the antifriction bearing 3 and the positioning collar 7 so that the piston 11 is abruptly loaded. As a result, the working oil in the chamber 18 will be abruptly discharged to its reservoirs 14 exclusively via the orifice 20, because the large passage 19 is closed by the same reason as described before. The orifice 20 having the small diameter exerts a high resistance to the abrupt flow of the working oil. As a result, the displacements of the antifriction bearing 3 and the shaft 2 are blocked against the action of the aforementioned abrupt load. In other words, the antifriction bearing pre-loading device A according to the first preferred embodiment of the present invention exhibits, although in the mode of the predetermined pre-load, a high rigidity against the abrupt load in the direction opposite to the pre-loading direction. Thanks to the one-way valve means B, moreover, the antifriction bearing pre-loading device A of the first preferred embodiment of the present invention can ensure and smooth the pre-loading of the antifriction bearing and can effectively prevent the antifriction bearing from being displaced backward against the load in the direction opposite to the pre-loading direction.

Figure 3:
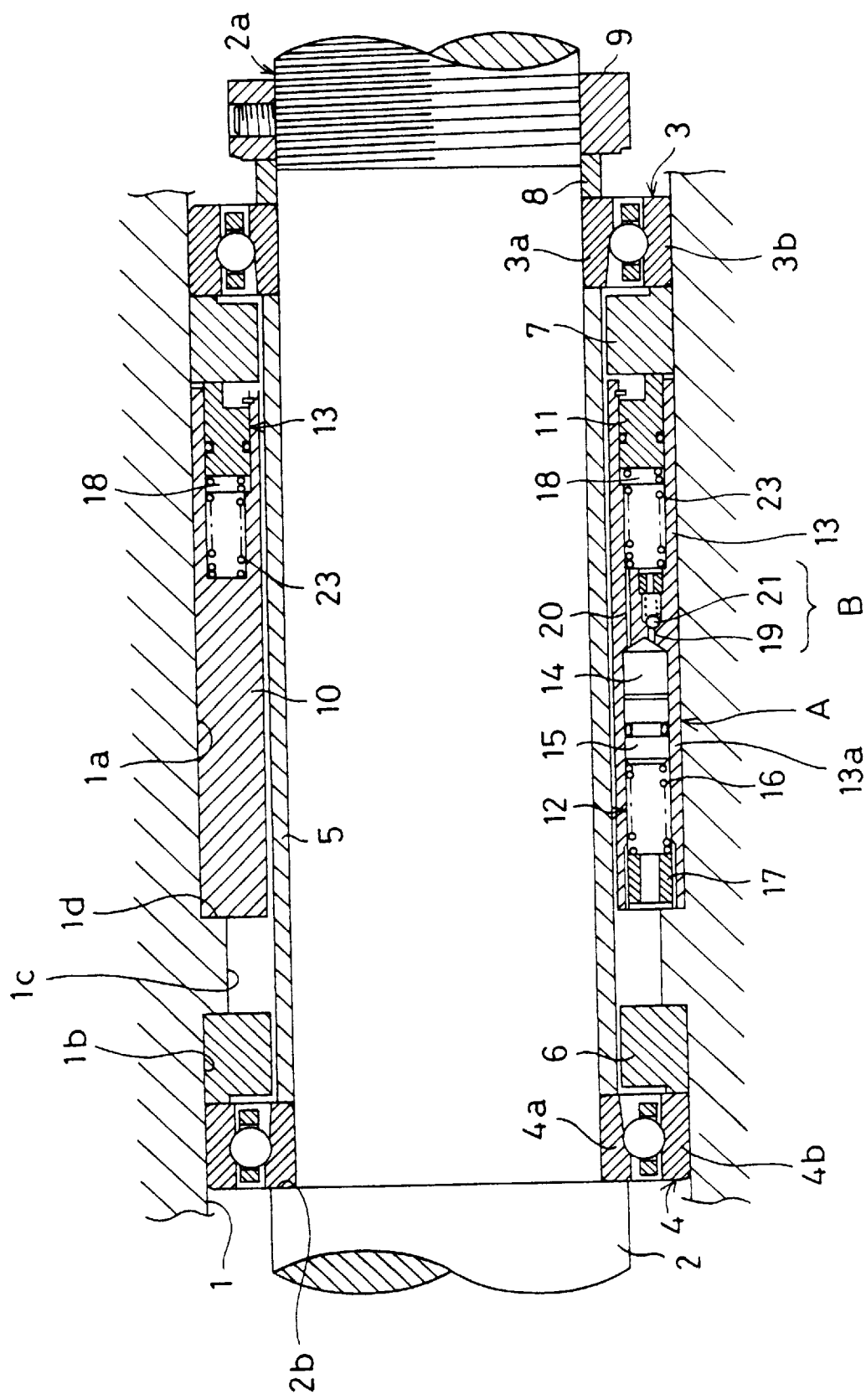
FIG. 3 is a longitudinal section of a bearing structure, in which a shaft is borne in a housing through an antifriction bearing pre-loaded by a pre-loading device according to a second preferred embodiment of the present invention.

With reference to FIG. 3, here will be described an antifriction bearing pre-loading device A according to a second preferred embodiment of the present invention. In this pre-loading device A, with a view to applying a stabler pre-load in association with the oil pressure generating means 12, an auxiliary pre-loading spring 23 is disposed as the auxiliary pre-loading mechanism in several circumferential portions of the working oil chamber 18, as formed at the back of the piston 11. In the first preferred embodiment of the present invention, what is applied to the antifriction bearing is the pre-load from the oil pressure generating means 12. In the second preferred embodiment of the present invention, on the other hand, not only this pre-load from the oil pressure generating means 12 but also the pre-load from the auxiliary pre-loading springs 23 is applied so that these synthesized pre-loads can be reliably and smoothly applied to the antifriction bearings 3 and 4.

Figure 4:
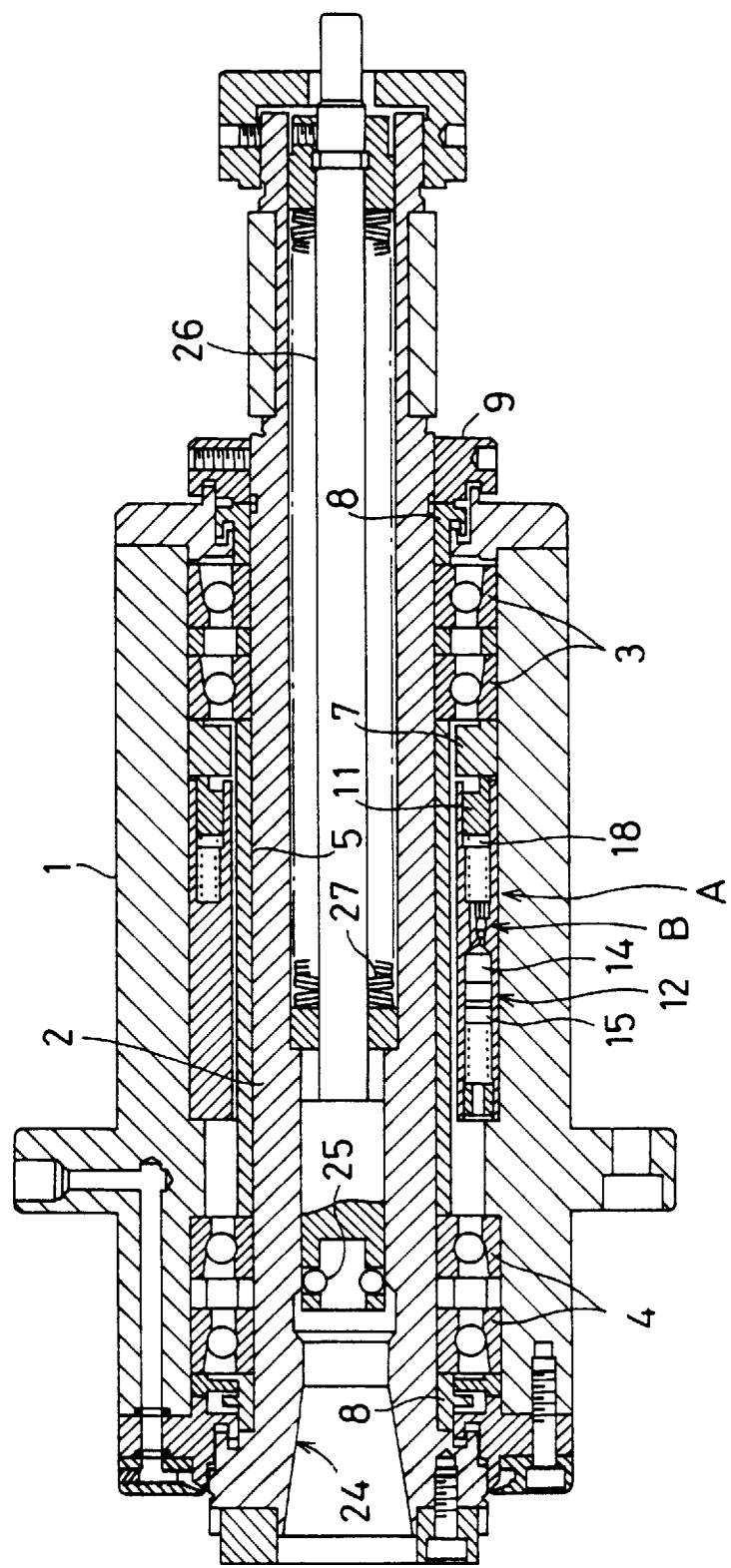
FIG. 4 is a longitudinal section of a bearing structure, in which a shaft for driving a tool is borne in a housing through an antifriction bearing pre-loaded by a pre-loading device according to a third preferred embodiment of the present invention.

With reference to FIG. 4, here will be described a pre-loading device A according to a third preferred embodiment of the present invention. In this pre-loading device A according to the third embodiment, the pre-loading device A according to the second embodiment is applied to a bearing structure for holding the shaft 2 next to drive the tool of a machining center. With reference to FIG. 4, the shaft 2 is formed at its one side end portion with a tapered bore 24 which has its diameter enlarged toward the end portion. In this tapered bore 24, there is fitted a tool not-shown. A plurality of balls 25 are removably engaged with the end portion of the tool which is fitted in the taper bore 24. A removing bar, i.e., draw bar 26 is axially movably inserted in the center of the shaft 2. A belleville spring 27 urges the draw bar 26 in the direction to lock the tool (as indicated as one direction). In the third preferred embodiment of the present invention, two antifriction bearings 3 and 4 for bearing the shaft 2 are used at each of the two sides on the outer circumference of the shaft 2. At the axially outer sides of the individual antifriction bearings 3 and 4, there are arranged the positioning collars 8 and 8. At the axially other end side of the antifriction bearing 3, there is arranged the nut 9. These positioning collars 8 and nut 9 are given the labyrinth structure to act as the non-contact seal for blocking the invasion of any foreign matter such as chips.

In the third embodiment, when the tool is to be removed, the draw bar 26 is gradually pushed in one direction of the drawing. Since the draw bar 26 is held in the pushed state for a while until the tool is removed, the power from the shaft 2 is sequentially transmitted through the antifriction bearings 3 and then the positioning collar 7 to thereby push and move the piston 11. However, after the positioning collar 7 has come into contact with the side of the annular cylinder 13, the piston is not moved any more and the draw bar 26 is pushed into by the shaft 2, thereby rendering the tool removable. The replacement operation of the tool is made while the shaft 2 does not rotate, so there is no problem even if the antifriction bearings 3, 4 is not pre-loaded.

Figure 5:
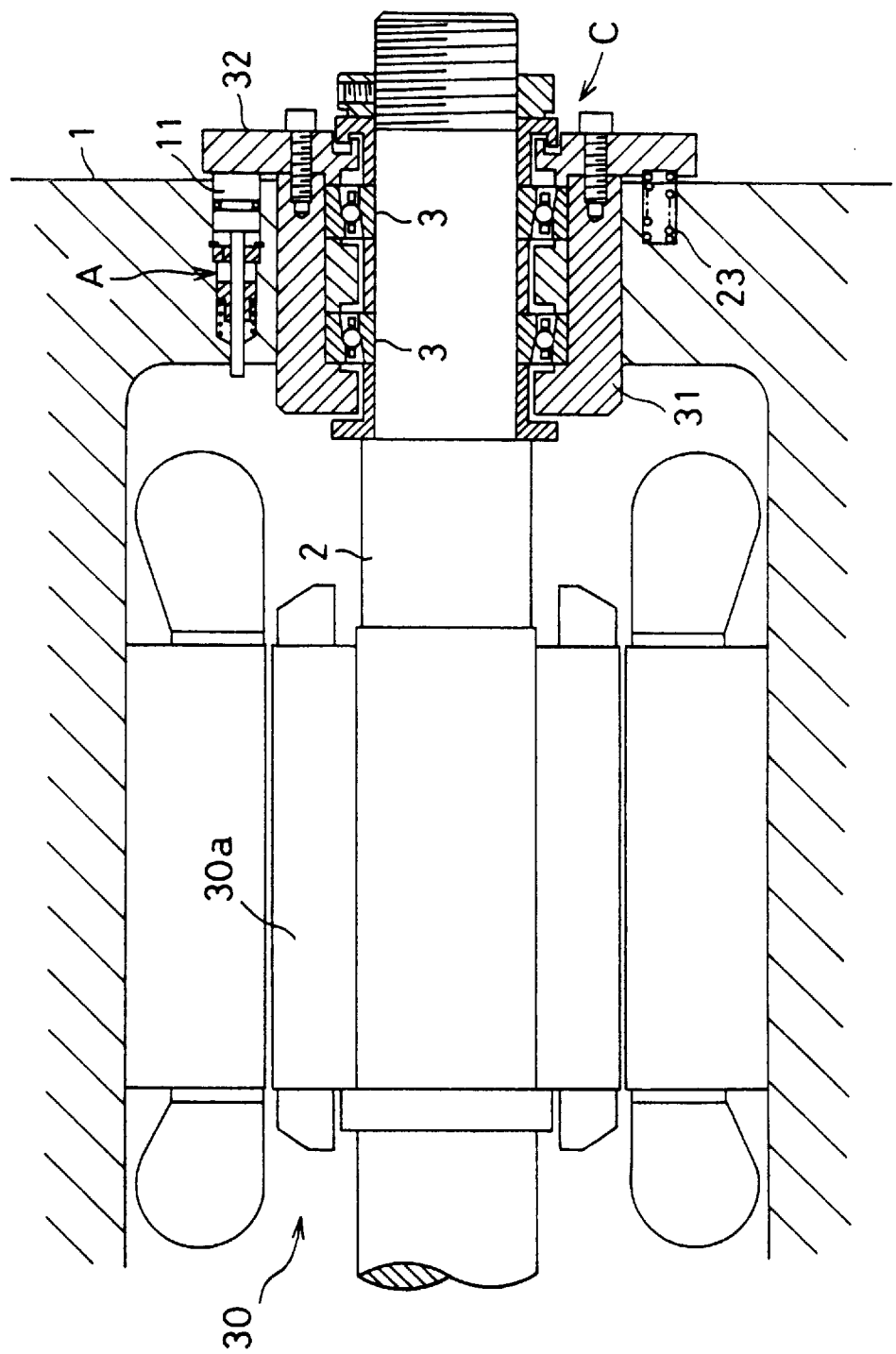
FIG. 5 is a longitudinal section of a bearing structure, in which a shaft is borne in a housing through an antifriction bearing pre-loaded by a pre-loading device according to a fourth preferred embodiment of the present invention.
Figure 6:
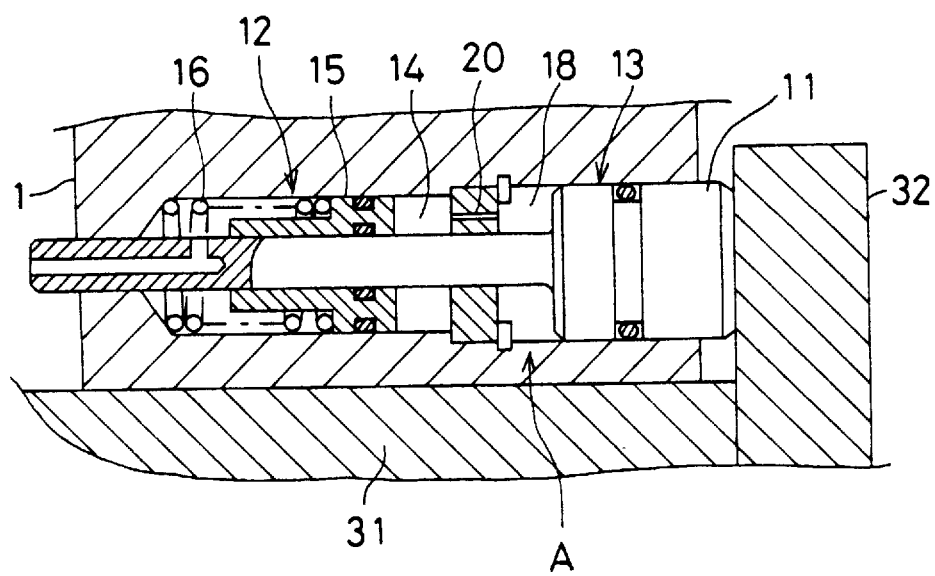
FIG. 6 is an enlarged section of oil pressure generating means for the pre-loading device of FIG. 5.

With reference to FIGS. 5 and 6, here will be described a pre-loading device A according to a fourth preferred embodiment of the present invention. This pre-loading device A of the fourth preferred embodiment is exemplified such that it can not be mounted like the foregoing individual embodiments, as a motor 30 having a rotor 30a is fitted on the shaft 2.

In this fourth preferred embodiment of the present invention, the shaft 2 has its one end supported by the housing 1 through a bearing device C. This bearing device C is equipped with: a pair of antifriction bearings 3 and 3; a bearing casing 31 fitting and supporting the antifriction bearings 3 and 3 between itself and the shaft 2; and a flange 32 fastened on one end of the bearing casing 31 by screws.

Moreover, the housing 1 is equipped at several circumferential portions of the bearing device C with the pre-loading device A and the auxiliary pre-loading springs 23 acting as the pre-loading auxiliary mechanism. The construction of the pre-loading device A according to the fourth preferred embodiment is basically similar to that of the first embodiment, mainly except that the pre-loading device A is not disposed in the annular shape concentric to the outer circumference of the shaft 2, and that it is not equipped with the one-way valve means B. In short, the pre-loading device A according to the fourth embodiment is equipped with the piston 11, the oil pressure generating means 12, the cylinder 13, the working oil reservoirs 14, the floating piston 15, the pressure regulating spring 16, the working oil chamber 18 and the orifice 20.

In operation, the piston 13 of the pre-loading device A abuts against the flange 32 of the bearing device C so that the flange 32 and the bearing casing 31 are axially displaced together in accordance with the axially forward and backward displacements of the piston 13. As a result, the outer races of the antifriction bearings 3 and 3 are axially displaced to fluctuate the pre-loads upon the antifriction bearings 3 and 3.

While there has been described what is at present considered to be preferred embodiments of the invention, it will be understood that various modifications may be made therein, and it is intended to cover in the appended claims all such modifications as fall within the true spirit and scope of the invention.

What is claimed is:

1. An antifriction bearing pre-loading device comprising:
   a pre-loading cylinder;
   a pre-loading piston arranged axially displaceably in said cylinder for pre-loading an antifriction bearing;
   a working oil chamber adjacent to said cylinder having a first volume of oil which changes when a second volume of working oil is received from an oil pressure generating means, said working oil displacing said piston axially in said cylinder; said oil pressure generating means including a working oil reservoir for reserving the working oil to be fed to said working oil chamber and for pressurizing and feeding the working oil reserved in said working oil reservoir to said working oil chamber; and
   a working oil passage including a small-diameter passage for providing a connection between said working oil reservoir and said working oil chamber, said working oil passage further includes a large-diameter passage for providing a connection between said working oil reservoir and said working oil chamber; a block mechanism for closing said large-diameter passage to block the flow of the working oil if the working oil flows in the direction from said working oil chamber to said working oil reservoir; and a bias mechanism for urging said block mechanism in said direction, and wherein said large-diameter passage has a larger diameter than that of said small-diameter passage; said working oil passage, pre-loading cylinder, working oil chamber, and oil pressure generating means are formed by a unit casing.

2. The antifriction bearing pre-loading device according to claim 1, wherein said working oil chamber is adjacent to a wall of said cylinder forming a space at a back side of said piston.

3. The antifriction bearing pre-loading device according to claim 1, wherein said unit casing is fitted in the inner circumference of a housing, in which a shaft is inserted, wherein the wall forming said unit casing forms said cylinder at one side of an axis of said unit casing, and wherein said oil pressure generating means is disposed in a plurality of circumferential positions in said unit casing.

4. The antifriction bearing pre-loading device according to claim 3, wherein said unit casing has one end retained by a step of a bore of said housing.

5. The antifriction bearing pre-loading device according to claim 1, wherein said small-diameter passage is an orifice or a sintered compact having micro through holes.

6. The antifriction bearing pre-loading device according to claim 1, wherein said block mechanism is a valve member.

7. The antifriction bearing pre-loading device according to claim 1, wherein said oil pressure generating means further includes: a hydraulic cylinder; a floating piston arranged in said hydraulic cylinder for pressurizing the working oil reserved in said working oil reservoir; and an adjusting mechanism for adjusting the degree of pressurization by said floating piston.

8. The antifriction bearing pre-loading device according to claim 7, wherein said adjusting mechanism has an adjusting spring for urging said floating piston in a direction to pressurize and feed the working oil from said working oil reservoir to said working oil chamber.

9. The antifriction bearing pre-loading device according to claim 1, further comprising an auxiliary mechanism for urging said pre-loading piston in an axial direction.

10. The antifriction bearing pre-loading device according to claim 9, wherein said auxiliary mechanism is made of a spring.

11. The antifriction bearing pre-loading device according to claim 9, wherein said auxiliary mechanism is arranged in said working oil chamber.

12. The antifriction bearing pre-loading device according to claim 1, wherein said pre-loading piston and said pre-loading cylinder are made annular to pre-load said shaft uniformly in the circumferential direction when it is arranged concentrically with the circumference of said shaft.

13. The antifriction bearing pre-loading device according to claim 1, wherein said antifriction bearing is an angular contact ball bearing.

14. The antifriction bearing pre-loading device according to claim 1, wherein said antifriction bearing is a tapered roller bearing.

15. A shaft bearing structure comprising: a housing; a shaft fitted in said housing; an antifriction bearing arranged between said housing and said shaft; and a pre-loading device for pre-loading said shaft,
wherein said pre-loading device includes:
a unit casing arranged in the inner circumference of said housing;
a pre-loading cylinder formed by said unit casing;
a pre-loading piston arranged in said cylinder for pre-loading said antifriction bearing axially;
a working oil chamber adjacent to said cylinder having a first volume of oil which changes when a second volume of working oil is received from an oil pressure generating means, said working oil displacing said piston axially in said cylinder; said oil pressure generating means including a working oil reservoir defined by the axially other side wall of said unit casing, for pressurizing and feeding the working oil reserved in said working oil reservoir to said working oil chamber; and
a working oil passage including a small-diameter passage for providing a connection between said working oil reservoir and said working oil chamber, said working oil passage further includes: a large-diameter passage for providing a connection between said working oil reservoir and said working oil chamber; a block mechanism for closing said large-diameter passage to block the flow of the working oil in the direction from said working oil chamber to said working oil reservoir; and a bias mechanism for urging said block mechanism in said direction, and wherein said large-diameter passage has a larger diameter than that of said small-diameter passage; said working oil passage, working oil chamber, and oil pressure generating means are formed by said unit casing.

16. The shaft bearing structure according to claim 15, wherein said working oil chamber is adjacent to a wall of said cylinder forming a space at a back side of said piston.

17. The shaft bearing structure according to claim 15, wherein said small-diameter passage is an orifice.

18. The shaft bearing structure according to claim 15, wherein said block mechanism is a valve member.

19. The shaft bearing structure according to claim 15, wherein said oil pressure generating means further includes: a hydraulic cylinder; a floating piston arranged in said hydraulic cylinder for pressurizing the working oil reserved in said working oil reservoir; and an adjusting mechanism for adjusting the degree of pressurization by said floating piston.

20. The shaft bearing structure according to claim 19, wherein said adjusting mechanism has: an adjusting spring for urging said floating piston in a direction to pressurize and feed the working oil from said working oil reservoir to said working oil chamber; and a spring receiving member for adjusting an urging degree of said adjusting spring.

21. The shaft bearing structure according to claim 15, wherein said antifriction bearing is axially thrust by said pre-loading piston.

22. The shaft bearing structure according to claim 21, wherein said antifriction bearing is arranged at each of two ends of said shaft, further comprising annular sleeves located between the outer circumference of said shaft and the individual inner races of the two antifriction bearings.

23. The shaft bearing structure according to claim 15, further comprising a positioning collar located between said pre-loading piston and an inner end side of the outer race of said antifriction bearing.

24. The shaft bearing structure according to claim 23, wherein said shaft has its end portion threaded, further comprising: a nut fastened on the threaded portion; and a positioning collar located between an outer end side of the outer race of said antifriction bearing and said nut.

25. The shaft bearing structure according to claim 15, wherein said shaft has a tool mounting portion at its leading end, further comprising a draw bar axially movably fitted in said shaft and urged in a direction to retain a tool in said tool mounting portion so that it is driven into said antifriction bearing in a direction opposite to the pre-loading direction when the tool is to be removed from a tapered bore.

26. The shaft bearing structure according to claim 25, wherein said tool mounting portion is said taper bore.

27. The shaft bearing structure according to claim 15, further comprising a bearing device including said antifriction bearing between said shaft and said housing, wherein said bearing device includes a flange portion, through which the pre-loading piston in said pre-loading device pre-loads said antifriction bearing in said bearing device.

28. The shaft bearing structure according to claim 27, further comprising a pre-loading auxiliary mechanism disposed in said housing for pre-loading said antifriction bearing auxiliarily through said flange.

29. The shaft bearing structure according to claim 28, wherein said pre-loading auxiliary mechanism is a spring.

30. The shaft bearing structure according to claim 28, wherein said antifriction bearing in said bearing device has its outer race axially displaced by the axial displacement of said flange so that it is pre-loaded.

* * * * *

UNITED STATES PATENT AND TRADEMARK OFFICE
CERTIFICATE OF CORRECTION

PATENT NO. : 5,803,619
DATED      : September 8, 1998
INVENTOR(S) : Tabata et al.

It is certified that error appears in the above-indentified patent and that said Letters Patent is hereby corrected as shown below:

On the title page, item "[30] Foreign Application Priority Data", please change

"Dec. 13, 1995" to --Dec. 13, 1994--.

Signed and Sealed this

Nineteenth Day of October, 1999

Attest:

Q. TODD DICKINSON

*Attesting Officer*   *Acting Commissioner of Patents and Trademarks*